UNITED STATES PATENT OFFICE.

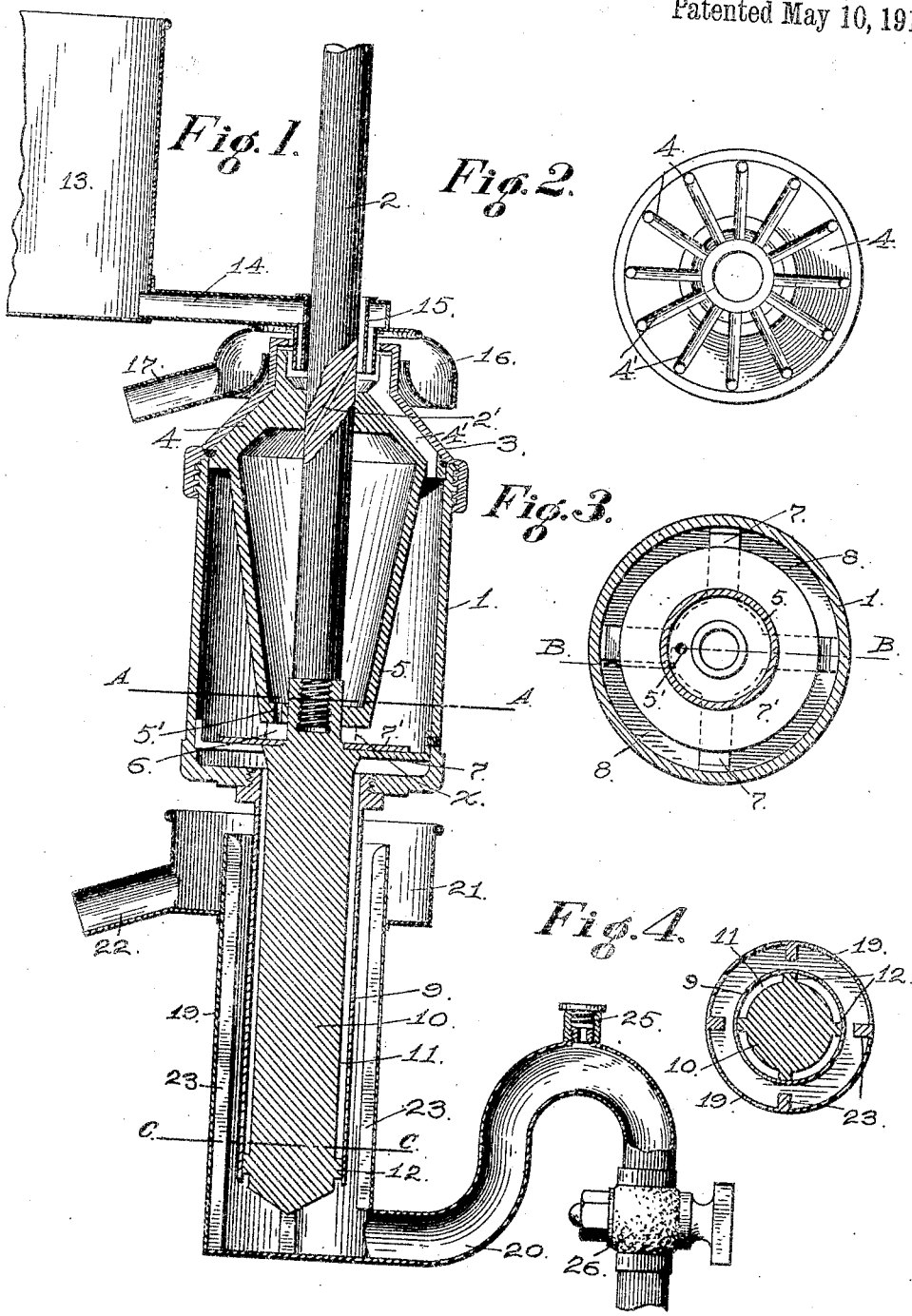

ANDERS PONTÉN, OF BERKELEY, CALIFORNIA.

CENTRIFUGAL MACHINE FOR PURIFYING LIQUIDS.

957,250.  Specification of Letters Patent.  Patented May 10, 1910.

Application filed May 6, 1908. Serial No. 431,213.

*To all whom it may concern:*

Be it known that I, ANDERS PONTÉN, a citizen of the United States, residing at Berkeley, in the county of Alameda and State of California, have invented certain new and useful Improvements in Centrifugal Machines for Purifying Liquids, of which the following is a specification.

The hereinafter described invention relates to the purifying of liquids generally, although more particularly designed for the treatment of water for the manufacture of ice; the object of the invention being to purify the liquids without changing the chemical composition thereof by oxygenation, by contact with the atmosphere, and to this end it consists in subjecting the liquid to be treated to centrifugal action within a liquid sealed apparatus revolved at a high rate of velocity, whereby the solid impurities, held in suspension in the liquid, are thrown, by the centrifugal force generated by the motion of the apparatus, outwardly and lodged against the wall of the revolving bowl containing the liquid under treatment, and the impure aeriform fluids forced toward the center of the said bowl and expelled therefrom through a vent provided for that purpose; the purified liquid discharging from the revolving bowl of the apparatus through a submerged outlet, and, by such submerged outlet, the purified liquid being discharged without being brought into contact with the outside atmosphere, thus avoiding the detrimental effect of oxygenation which otherwise would take place.

To comprehend the invention reference should be had to the accompanying sheet of drawings, wherein—

Figure 1 is an irregular sectional view of the apparatus taken on line B—B Fig 3 of the drawings. Fig. 2 is a detail plan view of the accelerator removed from the bowl which receives the liquid to be treated. Fig. 3 is a cross sectional plan view taken on line A—A of Fig. 1 of the drawings. Fig. 4 is a similar view taken on line C—C of Fig. 1 of the drawings.

In the drawings, the numeral 1 is used to indicate a suitable bowl for the reception of the liquid to be treated, which bowl is attached to a suspended drive shaft 2, driven by a belt or other suitable means, and through said drive shaft, within the bowl 1, is formed at an upward inclination a gas outlet vent 2'. The bowl 1 is provided with a removable cover 3, in which is fitted an accelerator 4, provided with a series of radial inlet passages 4'. This accelerator carries a downwardly projecting hollow conical extension 5, which, at its lower end portion, is provided with a vent opening 5', through which the gases are admitted into the interior of the said hollow conical extension. During the operation of the apparatus, when the bowl 1 is substantially filled with the liquid to be treated, there is formed below the conical extension 5, and inside of the dotted line $x$, Fig. 1 of the drawings, an annular space or channel 6 as hereinafter explained.

Within the bowl 1 and near the bottom thereof, is attached a cross piece 7, which carries and supports a dividing plate or disk 7', which, at its outer edge portion is cut out to provide the passages 8 for the escape of the purified liquid, which purified liquid discharges from the bowl 1 through said passages or discharge openings into a downwardly projecting tubular extension 9 of the said bowl 1. This tubular extension 9 is provided with a central core-piece 10, which depends from the cross pieces 7, and forms within the extension 9 an annular discharge passage 11, of a conveying capacity equal to the working capacity of the apparatus. At its lower end, the central core piece 10 is held in position by means of the spacing lugs 12.

The fluid or liquid to be treated is contained preferably in a supply tank or reservoir 13, located at any suitable point, which tank or reservoir is connected by the feed pipe or conduit 14 with an annular inlet 15, which delivers the liquid through the cover 3 to the accelerator 4, the liquid so delivered passing into the bowl 1 through the vertical radial inlets or passages 4' of the accelerator. If the feed or supply of liquid to be treated is greater than the outlet area of discharge the bowl 1 will become filled to overflowing and to avoid such overcrowding of the said bowl it is necessary that the feed or supply of the liquid be adjusted in accordance with its capacity of discharge into the tubular extension 9. To take care of such overflow of the liquid as may occur prior to the supply being properly adjusted, there is provided an annular receiving receptacle 16, from which extends a discharge 17, for conveying such overflow to a suitable place of deposit.

The tubular extension 9 extends within a receiver 19 for the purified liquid, which discharges from the bottom thereof through the outlet pipe 20. The receiver 19 into which the tubular extension 9 projects is filled with liquid, so that the outflow from said extension will be a submerged one and out of contact with the outside atmosphere. The intention is, as hereinafter explained, that the receiver 19 shall be filled to overflowing and, throughout the working or treatment of the liquid, a constant overflow maintained from the receiver 19, such overflow entering the annular trough 21, from whence it escapes through the outlet 22.

To prevent agitation and circulation of the purified liquid within the receiver 19 as delivered thereto from the revolving bowl 1, a series of vertical and radially extended wings or blades 23 are provided, which wings or blades bring the liquid delivered into the stationary receiver 19 to a state of rest.

In order to expel all air contained in the pipe 20 at the starting up of the apparatus for the work of purifying liquids, the said pipe is provided with an air vent 25. The said pipe 20 is also provided with an outlet regulating cock 26, the purpose of which is that the overflow of the purified liquid from within the receiver 19 may be gaged or regulated, so that a small fraction thereof will continually overflow the top of the receiver into the trough 21. It will be understood that the pipe 20 conveys the purified liquid to the respective point of discharge, which may be located at any point beyond the receiver 19.

The operation of purifying the liquid is as follows: The liquid to be treated is supplied from the reservoir 13 to the annular inlet 15, which delivers the liquid into the upper extension of the cover 3 of the rapidly revolving bowl 1, where it is caught in the accelerator passages 4', and instantly conveyed into the body portion of the bowl 1, gradually filling the annular space between the wall of the revolving bowl 1 and the wall of the conical extension 5, until the inner surface of the liquid reaches the dotted line $x$. While the liquid is traveling through the inlet passages 4' of the accelerator 4, the same attains the rotary speed of the revolving bowl 1, and enters the said bowl 1 at full velocity, continuing its downward travel on a line near to and parallel with the outer wall of the bowl, without mixing with the rest of the liquid forming the inner layer of the contents and acting as a seal near the central portion of the bowl. The liquid thus entering the bowl 1 is subjected to the maximum centrifugal force generated in the apparatus, under the influence of which the non-soluble impurities are separated and lodged against the wall of the bowl, while the aeriform fluids, by virtue of their lighter specific gravity, are forced to seek the central space or chamber 6 inside the dotted line $x$, which represents the extreme inner surface of the liquid under treatment, from whence they escape through the vent opening 5' into the interior of the conical extension 5, being discharged from the interior of the said extension through the outlet vent opening or bore 2' in the drive shaft 2, Fig. 1 of the drawings. The purified liquid leaves the separating chamber or interior of the bowl 1 through the series of outlets or passages 8 of the dividing plate or disk 7', and passing under the said dividing plate or disk 7' continues its course downwardly through the annular passage 11 of the tubular extension 9, until finally discharged at the extreme lower end of the said passage and delivered into and near the bottom of the receiver 19, which during the entire treatment of the liquid is kept filled to overflowing, by gaging the discharge of the purified liquid through the outlet pipe 20 by means of the regulating cock 26. The purified liquid being discharged from the tubular extension 9 through a submerged outlet, is prevented from coming into contact with the outside atmosphere.

When the apparatus is used for purifying milk, or other compound liquids of different specific gravity, from which the cream, or lighter component in such liquid, will partly separate and collect along the surface of the conical extension 5, the dividing plate 7' is dispensed with, in order to allow or leave an unobstructed passage for the separated lighter component and permit the same to move downward and remix with the rest of the treated liquid just prior to being discharged from the apparatus.

Having thus described the invention, what is claimed as new and desired to be protected by Letters Patent is—

1. An apparatus for purifying liquids, the same comprising a revoluble bowl provided with vent outlets for the escape of gases, an accelerator provided with radial inlets carried by the bowl for delivering liquid therein, a receiver located below the bowl for the reception of the purified liquid, and a tubular extension depending from the bowl for discharging the purified liquid into the said receiver.

2. An apparatus for purifying liquids, the same comprising a revoluble bowl, mechanism for supporting the same and imparting rotation thereto at a high rate of speed, an accelerator provided with a series of radial inlets carried by the said bowl, a conical extension depending from the accelerator, a stationary receiver located below the bowl, said receiver being filled to overflowing during the working of the apparatus, and a tubular extension depending from the bowl for the discharge of the purified liquid into the stationary receiver, said extension being submerged within the said receiver.

3. An apparatus for purifying liquids, the same comprising a revoluble bowl, a dividing plate provided with outlets arranged in the bottom portion of the bowl, an accelerator provided with a series of radial inlets carried by the bowl at its upper portion, a stationary receiver normally filled to overflowing arranged below the bowl, and a tubular extension depending from said bowl and extended within the stationary receiver.

4. An apparatus for the described purpose, the same comprising a revoluble bowl for the liquid to be treated, a tubular outlet extension depending from the said bowl, a stationary receiver normally filled to overflowing and within which the tubular depending outlet extension is submerged, and an air vented discharge pipe leading from the bottom portion of the stationary receiver.

5. In an apparatus for the described purpose, the combination with a revoluble bowl for the liquid to be treated, of means for supplying liquid thereto, of a stationary receiver normally filled to overflowing located below the bowl, a tubular outlet extension depending from the said bowl and extended into the receiver, a series of vertically extended radial wings or blades within the stationary receiver, and an air vented discharge pipe leading from the bottom portion of the said receiver.

6. In an apparatus for the described purpose, the combination with a revoluble bowl for the liquid to be treated, of means for imparting rotation thereto, said bowl being provided with outlet vents for the escape of gases, an accelerator provided with a series of radial inlets carried by the bowl, a supply reservoir for the liquid to be treated, communication between said reservoir and an annular inlet for delivering to the accelerator, a dividing plate provided with outlets arranged within the bottom portion of the bowl, a stationary receiver located below the said bowl, a tubular outlet extension depending from the bowl and extended within the stationary receiver, a series of vertical extended radial wings or blades arranged within the receiver, and a discharge pipe leading from the receiver.

In testimony whereof I have signed my name to this specification in the presence of two subscribing witnesses.

ANDERS PONTÉN.

Witnesses:
  N. A. ACKER,
  WM. F. BOOTH.